United States Patent [19]
Tucker, Jr.

[11] 3,746,351
[45] July 17, 1973

[54] RADIAL SHAFT SEAL WITH POSITIVELY RETAINED GARTER SPRING

[75] Inventor: Alfred J. Tucker, Jr., Elgin, Ill.

[73] Assignee: Chicago Rawhide Manufacturing Company, Elgin, Ill.

[22] Filed: July 19, 1971

[21] Appl. No.: 163,868

[52] U.S. Cl. .................... 277/152, 277/48, 277/184
[51] Int. Cl. ...................... F16j 15/32, F16j 15/54
[58] Field of Search .......................... 277/47, 48, 163, 277/153, 184, 152

[56] References Cited
UNITED STATES PATENTS
2,736,585  2/1956  Riesing .............................. 277/153
2,291,570  7/1942  Clark ................................. 277/48
2,466,335  4/1949  Stearns .............................. 277/48

FOREIGN PATENTS OR APPLICATIONS
972,155  5/1959  Germany ........................... 277/152

Primary Examiner—Samuel B. Rothberg
Attorney—James T. FitzGibbon

[57] ABSTRACT

A radially acting shaft seal having associated therewith a garter spring which is at least partially confined within a spring-retaining groove formed in the primary sealing lip by radially spaced-apart tabs or fingers extending axially outwardly from an inner rigid support element. The invention reduces or eliminates the tendency of the garter spring to "pop out" without substantially decreasing the tolerance of the seal assembly to radial run-out. In addition, seals of the present invention utilize relatively shallow spring-retaining grooves with the result that the sealing element is less likely to suffer damage upon separation from the mold.

4 Claims, 5 Drawing Figures

PATENTED JUL 17 1973
3,746,351
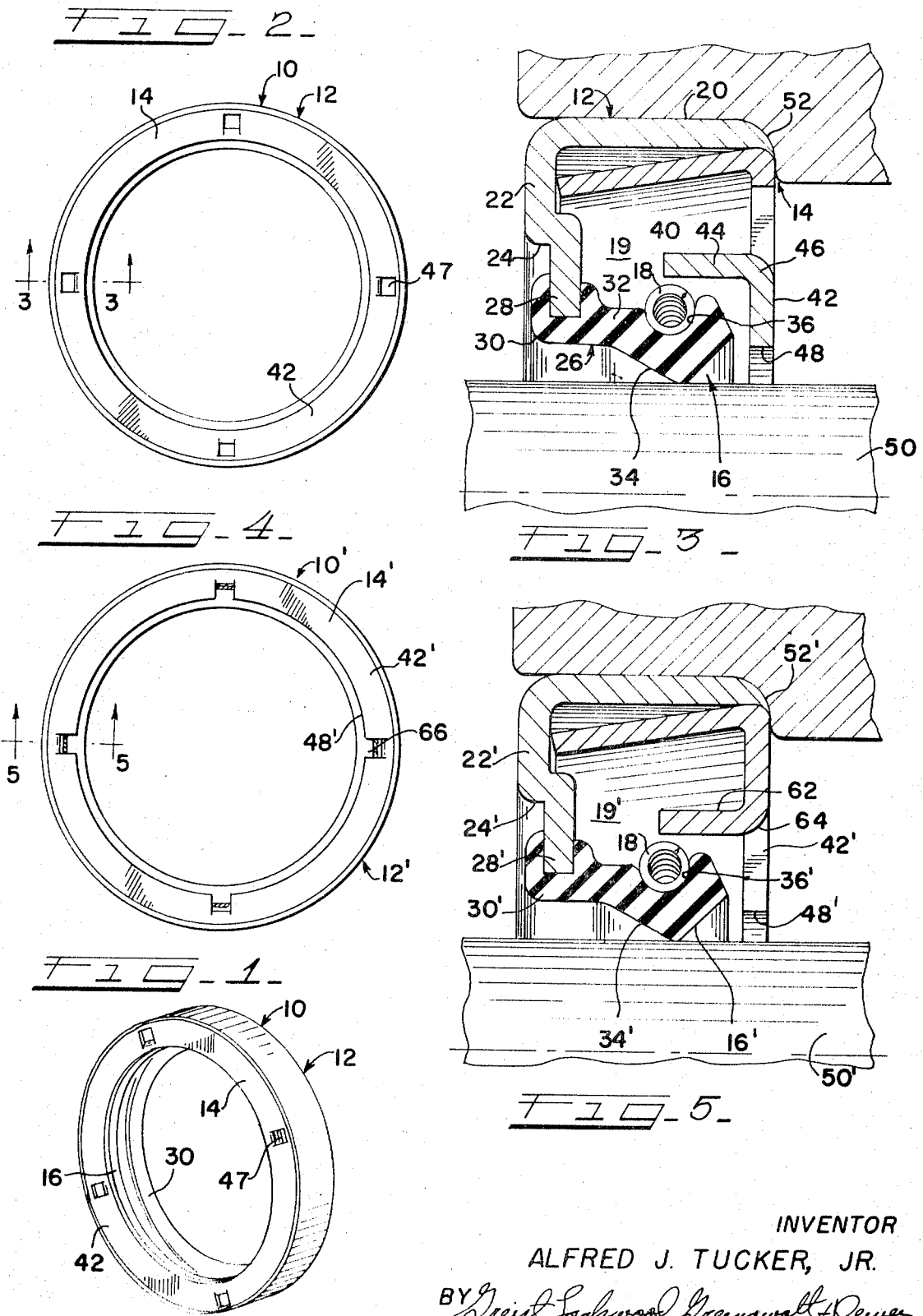
INVENTOR
ALFRED J. TUCKER, JR.
BY Driest, Lockwood, Greenawalt & Dewey
ATT'YS

RADIAL SHAFT SEAL WITH POSITIVELY RETAINED GARTER SPRING

BACKGROUND OF THE INVENTION

This invention relates to improvements in radially acting shaft seals, particularly those shaft seals which include a rigid annular support element and a flexible seal-forming element which extends at least partially in an axial direction, and which includes a garter spring adapted to urge the seal-forming element radially into snug sealing contact with the member to be sealed. The invention provides constructions adapted to positively retain a garter spring in place within the seal, and at the same time, provides a construction which does not decrease tolerance to radial run-out of the sealing element. Furthermore, the improved seals are compatible with the heretofore used assembly process wherein the garter spring is inserted into the spring-retaining groove.

Radial seals comprising a metal casing and an elastomeric or other flexible sealing member and utilizing a garter spring retained in a groove formed in the sealing member are well known. Generally, some seating means is provided in an attempt to maintain the garter spring in an optimum position with respect to the primary sealing lip. In many instances, the seating means comprises an annular groove radially spaced apart from the primary sealing lip, and as long as the garter spring is seated in this groove, uniform distribution of the seating forces urging the primary sealing lip into sealing contact is achieved. Such seals are in widespread use, and, when properly installed, have been found to provide highly satisfactory sealing characteristics. However, because of occasional inadvertent mishandling of particular seals or bearing assemblies, particularly during installation, there is a real possibility that the garter springs of previously available forms of seals are not properly disposed in the spring seating grooves of these seals after installation. Bearing assemblies are sometimes dropped, or otherwise jolted so severely that the garter spring can and sometimes does, in the case of seals heretofore available, pop out of the retaining groove. Hence, the overall problem is referred to as one of garter spring "pop-out." The importance of the problem may be appreciated by reference to the fact that, after assembly, it is virtually impossible to determine by any reasonable quality control inspection, except for dismantling the entire assembly, whether or not the garter spring has popped out of its seating groove. Because of the internal hidden positioning of the garter spring element, in most instances, there is no universally satisfactory quality control procedure by which the actual positioning of the garter spring can be determined. Consequences of garter spring pop-out can include non-uniform distribution of pressure along the seal band, improper sealing action, shortened seal life, and damage to bearing assemblies due to lubrication failure, or to entanglement of bearings or other machine parts with the metal garter springs.

A number of approaches have been attempted for the purpose of resolving the garter spring pop-out problem. For example, it has been suggested that the spring be molded in place, that is, embedded within the elastomeric sealing element during molding of the sealing element. However, an embedded garter spring does not provide the same rate and other highly desirable operating characteristics which are achieved by an independent, separate spring freely disposed within a spring-retaining groove. The use of radially extending back-up casings and other structures have been suggested, but the back-up casings heretofore suggested do not assure against partial pop-out and mispositioning of the spring, and may interfere with radial run-out. However, the use of the back-up casing does generally assure that the spring will not be completely disengaged with the elastomeric sealing element, and does assure that an errant spring does not become entangled with the bearing assembly or other internal operating parts.

Another suggested approach to the solution of the garter spring pop-out problem has been to utilize deep radially extending spring-retaining grooves. However the use of deeply extending radial grooves or equivalent structures has been found frequently to result in either actual structural defects in such mass produced seals. For example, as will be explained more fully hereinafter, it is common for a polymeric sealing material forming the seal element to be shaped by a molding surface, and the molding surface and a newly formed sealing element are usually separated while the newly molded sealing element is generally quite hot and only freshly cured. When the shaping surfaces include a deeply extending undercut or an extended annular radial projection to shape a deep spring-retaining groove, the outer portion of the spring-retaining groove must necessarily be severely abused during separation. The freshly molded, hot seal-forming material must be flexed, buckled or stretched around the undercut or other shaping surface in order to remove the part from the mold. In some instances the portion of the wall of the spring-retaining groove adjacent the annular mouth is distorted so severly that the sidewall thereof actually develops a crack or split. In other instances, the stressing causes development of an incipient tear which does not become visually discernible, however, until after the sealing member has been in a position of use for some time. For example, some polymeric silicone sealing materials, which are highly desirable because of a tendency to absorb lubricants and become self-lubricating, tend to swell at least slightly upon absorption of lubricants. The latent or incipient splits referred to above can develop into actual splits when the sealing member swells in this manner. Such structural defects, of course, are most undesirable, but are the natural or inherent consequence of the presence of the deeply radially extending spring seating grooves.

Thus, each of the solutions or approaches heretofore suggested for better assuring retention of the garter spring within the spring-retaining groove associated with the primary sealing lip was characterized by substantial shortcomings or defects, and none of the previously taken approaches has proven entirely satisfactory.

In view of the foregoing, an object of the present invention is to provide means for positive retention of the garter spring in its proper operating position on a radial shaft seal assembly.

It is a further object of the present invention to provide a radial shaft seal design which does not require the utilization of a molding method requiring deeply extending undercuts which so severely strain the molded sealing element upon separation from the mold that actual, latent, or incipient structural defects are likely to be imparted to the element.

It is a further object of the present invention to provide a radial shaft seal in which a relatively shallow spring-retaining groove can be utilized, and in which the garter spring is confined therein during assembly and operation, and in which there is substantially no interference by the confining structures with the normal operating movement and other changes in position of the primary sealing element due to radial run-out or the like.

Another object is to provide a fluid seal having a flexible sealing element, and a metal casing providing a secondary seal, with a portion of the casing including elements formed therefrom and extending into a position closely radially overlying a garter spring adapted to urge the sealing lip portion of the seal element into a tight sealing fit with an associated shaft or otherwise relatively movable member.

These and other objects, features and advantages of the invention which will become more clearly apparent hereinafter, are achieved in accordance with the present invention by the provision of a seal assembly having the garter spring thereof disposed in a relatively shallow, radially extending groove in the primary sealing element, and having the garter spring confined within that groove by radially spaced-apart, axially extending tabs or fingers forming a part of a rigid annular structural element.

The manner in which the foregoing advantages, objects and features are accomplished will become more apparent when reference is made to the accompanying detailed description of the preferred embodiments of the invention and when reference is made to the accompanying drawings wherein like reference numerals indicate corresponding parts throughout.

BRIEF DESCRIPTION OF THE DRAWINGS

FIG. 1 is a perspective view of one form of bonded radial shaft seal made in accordance with the present invention;

FIG. 2 is an end elevational view of the seal shown in FIG. 1 taken from the "wet" side of the seal;

FIG. 3 is an enlarged vertical sectional view taken approximately along the line 3—3 of FIG. 2;

FIG. 4 is an end elevational view of an alternative form of seal taken from the "wet" side of the seal; and FIG. 5 is an enlarged cross-sectional view of the seal of FIG. 4, along lines 5—5 thereof.

DESCRIPTION OF THE PREFERRED EMBODIMENTS OF THE INVENTION

Referring now to the drawings in greater detail, FIGS. 1, 2 and 3 show the invention to be embodied in a radially acting bonded shaft seal assembly generally indicated at 10. This seal 10 comprises an outer or mounting cup 12, an inner or reinforcing cup 14, a flexible sealing element 16 and biasing means in the form of a garter spring 18. The outer cup 12 is preferably a metal stamping which includes an axially extending mounting flange portion 20, a radially extending flange 22 terminating in an axially offset seal element mounting portion 24. A suitable flexible elastomeric material 26, or other flexible sealing material is bonded to the radially inner end 28 and includes a bonding portion 30 which surrounds the inner end 28 along three surfaces thereof.

The elastomeric material 26 is formed so as to include both an axially extending collar portion 32 and a radially extending primary sealing lip portion 34. A garter spring-retaining groove 36 is formed in the collar portion 32 and lies radially outwardly of the primary sealing lip 34; the garter spring 18 lies within the groove 36.

The inner cup 14 is disposed radially with the outer cup 12 and includes an axially extending portion 40 and a radially extending flange 42. A plurality of axially extending tabs or fingers 44 are stamped out of flange 42 by a die (not shown) which cuts stamping 42 along three sides of each finger 44 leaving a connecting portion 46 attached to the portion of the flange 42 which lies adjacent the radially inner end 48 thereof. Thereafter, the fingers 44 are bent into a generally axial position, leaving a plurality of openings 47 in the flange 42. The connecting portion 46 may be regarded as a fourth side of the stamped, substantially rectangular tab, and connecting portion 46 is disposed along a line which is normal to the radius of the curvature of annular flange 42.

In keeping with the invention, the tab 44 extends axially to a position which is radially slightly spaced apart outwardly from the garter spring 18. However, the tab 44 is sufficiently close to the sealing element 16 so that in the so-called free-state condition of the sealing element 16, in which the inside diameter of the annular, inwardly acting sealing lip 34 is at least slightly smaller than the diameter of a shaft for which it is intended, the gaps between the tabs 44 and those portions of the sealing element lying to either side of groove 36 are less than the diameter of each turn of the coil-type garter spring 18. When the sealing element 16 is flexed radially outwardly in use as a consequence of engagement with shaft 50, these gaps sizes are diminished.

The inner cup 14 is dimensioned so as to reside within the axially extending base portion 20 of the outer cup 12, and is retained axially within the cup 12 by a crimped portion 52 of the mounting flange 20. It will be noted that the term "cups" is customarily applied to stampings 12, 14, although both actually have concentric circular openings defined by the flanges 12, 14.

Consequently, the sealing element 16 is maintained in concentric orientation with the annular mounting flange 20 due to the bonding of elastomeric material 26 to the annular inner end 28 of the outer cup 12. The abutment of the inner cup 14 against the base portion 20 of the outer cup 12 maintains concentricity of tabs 44 which are formed from and consequently fixed with respect to inner cup 14. Thus, appropriate positioning of the axially extending tabs 44 relative to the garter spring and sealing element 16 is assured. Because of the clearance between the tabs 44 and the spring 18, the seal can accomodate a certain amount of radial run-out without bringing spring 18 into contact with tab 44.

Referring now specifically to the embodiment shown in FIGS. 4 and 5, it will be appreciated that many of the structures and elements referred to in FIGS. 4 and 5 are substantially identical to or very similar to the corresponding structures or elements previously described in detail and shown in FIGS. 1-3. Therefore, these elements will be referred to hereinafter using the same numerals used in the previous description, except that, in FIGS. 4-5 the numerals are primed. Consequently, any parts, structures, or elements described or identified in FIGS. 4 and 5 by numerals less than 60 have already been described in connection with the embodiment shown in FIGS. 1-3.

The embodiment shown in FIGS. 4 and 5 include tabs 62 which are cut from the radially inward margin 48' of the radially extending flange portion 42'. Connecting portion 64, as in the case of connecting portion 46, extends along a straight line which is substantially normal to the radius of the annular flange 42'. The tabs 62 also extend axially of the associated shaft 50 and are spaced apart from the spring 18'. The gap or clearance between respective adjacent portions of the tab 62 and the sealing element 16' at either side of the garter spring-retaining groove 36' is a dimension which is less than the outside dimension of each individual coil of the garter spring 18' when the sealing element 16' is in its unloaded or so-called free-spaced condition. As in the case of the embodiment disclosed in connection with FIGS. 1-3, this gap is reduced somewhat when the sealing element 16' is flexed radially outwardly by reason of contact with the shaft 50'.

It may be noted that, since the tabs 44, 62 are cut respectively from the radially extending flange portions 14, 14', openings or discontinuities 47, 66 are present in the flanges 42, 42', respectively. In the embodiment illustrated in FIGS. 1-3, opening 47 occurs adjacent the radially outward extreme of inner cup 14, whereas in the embodiment illustrated in FIGS. 4 and 5, the opening 66 is adjacent the radially inward edge or margin of the inner cup 14'. Although either arrangement is satisfactory for use in accordance with this invention, the embodiment shown in FIGS. 1-3 is sometimes preferred, since this configuration is believed to provide for better circulation and drainage of fluid from the general regions 19, 19' between the inner cups 14, 14' and the outer cups 12, 12' as a consequence of the radially outward positioning of openings.

Thus, in accordance with this invention, positive retention of the garter spring 18 in the retention groove 36 is achieved with no interference of sealing element 16, 16' and in a structure which permits unfettered radial run-out of sealing element 16, 16'. Moreover, retention of garter spring 18, 18' in its proper position within garter spring retaining grooves 36, 36' is assured due to the proximity of the plurality of tabs 44, 62, respectively. Therefore, dropping the improved seal, hammering it in the course of installations, or otherwise subjecting the completed seal unit to shocks and disturbance, does not result in separating the spring from the seal.

The improved seal units of the invention may be assembled in use without difficulty and by a method which does not differ substantially from prior art methods. Accordingly, the springs 18, 18' are first properly positioned within the retaining groove 36, 36'. Subsequently, the inner cups 14, 14' are positioned within the outer cups 12, 12'. Thereafter, the tabs 44, 62 may be bent downwardly into an axial position, that is, into a position parallel with the associated shaft 50 and overlying the springs 18, 18'. Thereafter, the rolled or crimped portions 52, 52' may be formed respectively on the cups 12, 12', 14, 14' to lock them into an axially assembled position. In this manner, the springs 18, 18' are inserted and maintained in their desired positions and escape from the groove 36, 36'. Accordingly, the prior art problem of partial escape of the garter spring has been eliminated as well as the problem of a complete escape of the spring occasioned by departure of the spring from the groove 36 and movement axially of the shaft or other associated part into the interior of the region to be sealed.

Accordingly, it will be seen that the present invention provides an improved oil seal unit having a number of advantages and characteristics, including those herein pointed out and others which are inherent in the invention. Since a number of changes in the foregoing embodiments of the invention, which were described by way of example may occur to those skilled in the art, it is contemplated that such changes and variations may be made without departing from the spirit of the invention or the scope of the appended claims.

I claim:

1. A shaft seal unit comprises, in combination, a relatively flexible sealing element and a relatively rigid casing element, said resilient sealing element including at least one lip portion adapted to form a primary seal with an associated, relatively movable element, means in said sealing element for receiving a circumferentially extending, radially acting garter spring, said receiving means being disposed in substantial radial alignment with said one lip, and a spring disposed within said receiving means, said casing including a mounting flange portion adapted to be received within a machine member, and a seal element bonding portion with at least one margin thereof bonded to said sealing element, said rigid casing element also having a spring retaining portion thereof extending substantially axially and disposed in a closely radially spaced apart relation to said garter spring, with the remainder of said rigid casing element being axially spaced from said sealing element.

2. A shaft seal unit as defined in claim 1 wherein said casing member includes at least two elements, and wherein said bonding portion is formed from one of said elements and wherein said spring retaining portion is formed from the other of said elements.

3. A shaft seal unit as defined in claim 1 wherein said seal unit is a radially inwardly acting seal, and wherein said spring retaining portion comprises a plurality of tabs spaced circumferentially about said casing and lying radially outwardly of said spring.

4. A fluid seal assembly for mounting between relatively movable first and second parts, and for retaining a fluid within an enclosed region, said seal assembly including a rigid annular casing member and an annular elastomeric seal-forming member bonded to a portion thereof, said elastomeric member comprising an axially extending portion having radially inner and radially outer surfaces, said axially extending portion including a radially extending portion extending from one of said surfaces and adapted to form a primary seal with said first part, said axially extending portion including a recess extending radially into the other of said surfaces adjacent said radially extending portion, garter spring means disposed in said recess for urging said radially extending portion radially against said first part, said casing member including means for forming a fluid-tight seal between a portion of said casing and said second part, and first and second radially extending legs, both of said legs being axially spaced from said spring, and at least one of said legs including a plurality of axially extending spring retainer portions disposed in closely radially spaced apart relation to said spring means.

* * * * *